US012613948B1

(12) United States Patent
Bethancourt et al.

(10) Patent No.: US 12,613,948 B1
(45) Date of Patent: Apr. 28, 2026

(54) GENERATIVE ARTIFICIAL INTELLIGENCE BASED IVR SYSTEM RESPONSES FOR REAL TIME AUTHENTICATION AND DATA ACCESS WITH DISPARATE COMMUNICATION NETWORKS

(71) Applicant: Forward Lending, Inc., Austin, TX (US)

(72) Inventors: Jose Bethancourt, Austin, TX (US); Jesus Marco del Carmen, Austin, TX (US); Mit Shah, Chevy Chase, MD (US); Mustafa Ali, Austin, TX (US); Christopher Ayre Boggs, Austin, TX (US)

(73) Assignee: Forward Lending, Inc., Austin, TX (US)

( * ) Notice: Subject to any disclaimer, the term of this patent is extended or adjusted under 35 U.S.C. 154(b) by 109 days.

(21) Appl. No.: 18/613,930

(22) Filed: Mar. 22, 2024

Related U.S. Application Data

(63) Continuation-in-part of application No. 18/424,630, filed on Jan. 26, 2024, which is a continuation-in-part of application No. 18/509,183, filed on Nov. 14, 2023.

(60) Provisional application No. 63/533,468, filed on Aug. 18, 2023.

(51) Int. Cl.
*G06F 21/32* (2013.01)
*G10L 15/18* (2013.01)

(52) U.S. Cl.
CPC .............. *G06F 21/32* (2013.01); *G10L 15/18* (2013.01)

(58) Field of Classification Search
CPC ................................. G06F 21/32; G10L 15/18
See application file for complete search history.

(56) References Cited

U.S. PATENT DOCUMENTS

| | | | |
|---|---|---|---|
| 2021/0342901 A1* | 11/2021 | Wang | G06Q 30/04 |
| 2022/0019985 A1* | 1/2022 | Dundigalla | G10L 15/063 |
| 2022/0020364 A1* | 1/2022 | Dundigalla | G06Q 20/32 |
| 2023/0334450 A1* | 10/2023 | Dundigalla | G10L 15/22 |
| 2023/0412731 A1* | 12/2023 | Mundie | H04M 3/493 |
| 2024/0221738 A1* | 7/2024 | Garg | G10L 25/78 |
| 2024/0282298 A1* | 8/2024 | Koneru | G10L 15/183 |

* cited by examiner

*Primary Examiner* — Brian Whipple

(57) ABSTRACT

Systems, methods, and non-transitory computer readable media are configured to perform operations comprising receiving, by a computing system, a set of prompts from an interactive voice response (IVR) system of an institution during a session; providing, by the computing system, data associated with the set of prompts to one or more machine learning models trained based on training data; and based on the one or more machine learning models, generating, by the computing system, during the session a set of responses to the set of prompts for the IVR system to at least one of a) authenticate a user and b) access targeted account data maintained by the institution through the IVR system.

20 Claims, 7 Drawing Sheets

600

100

Institution 130

IVR System 132

Call Provider 120

Authentication Platform 102

Third Party App 104

Embedded Component 106

108

110

Figure 6:
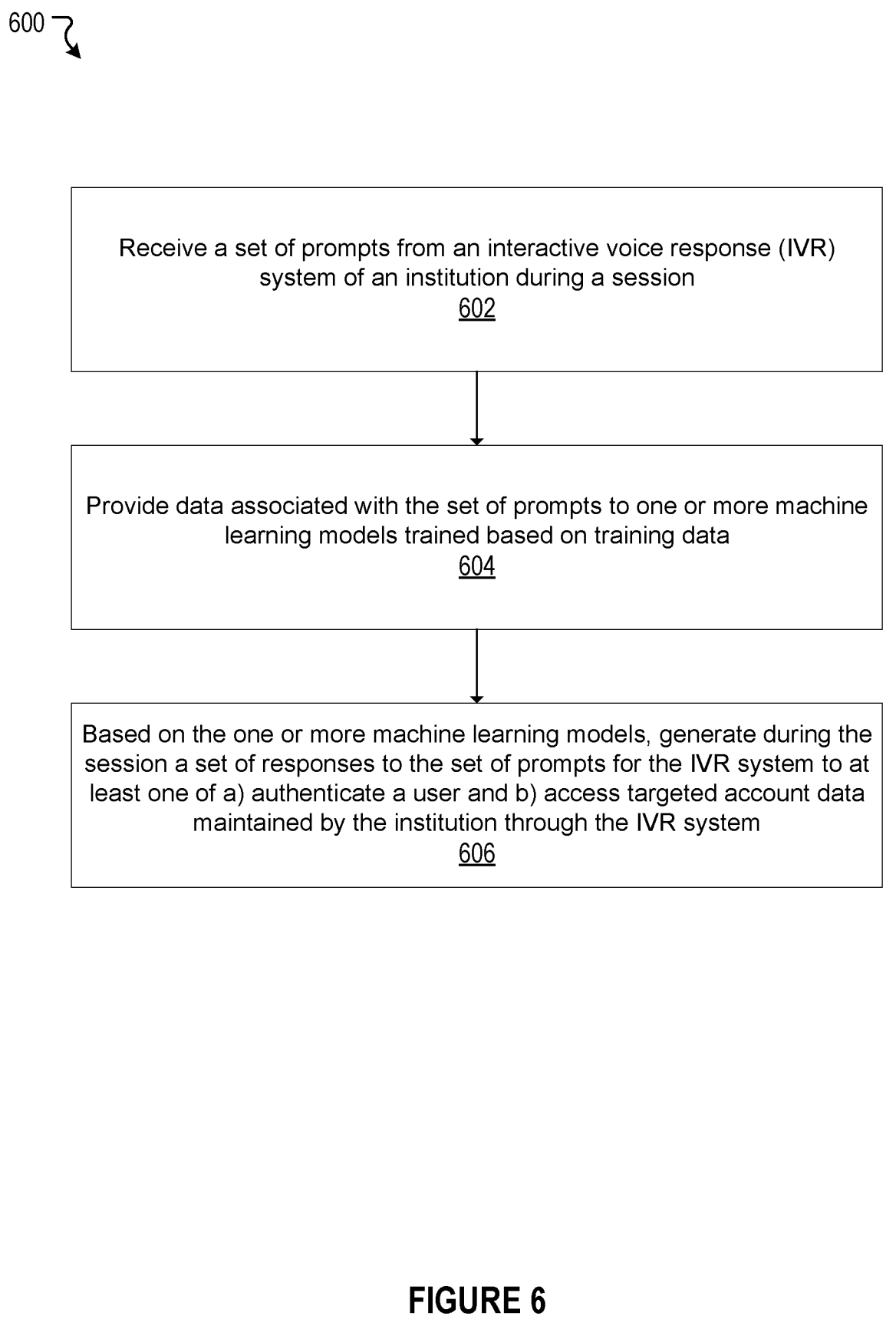

600

Receive a set of prompts from an interactive voice response (IVR) system of an institution during a session
602

Provide data associated with the set of prompts to one or more machine learning models trained based on training data
604

Based on the one or more machine learning models, generate during the session a set of responses to the set of prompts for the IVR system to at least one of a) authenticate a user and b) access targeted account data maintained by the institution through the IVR system
606

Processor 702

Instructions 724

Main Memory 704

Instructions 724

Non-Volatile Memory 706

Network Interface Device 720

Network
740

Bus
708

Video Display 710

Alpha-Numeric Input Device 712

Cursor Control Device 714

Machine-readable Medium 722

Instructions
724

Database
730

Signal Generation Device 718

GENERATIVE ARTIFICIAL INTELLIGENCE BASED IVR SYSTEM RESPONSES FOR REAL TIME AUTHENTICATION AND DATA ACCESS WITH DISPARATE COMMUNICATION NETWORKS

CROSS-REFERENCE TO RELATED APPLICATIONS

This application is a continuation-in-part of U.S. application Ser. No. 18/424,630, filed on Jan. 26, 2024 and entitled "Machine Learning Based Authentication And Real Time Data Access With Disparate Communication Networks", which is a continuation-in-part of U.S. application Ser. No. 18/509,183, filed on Nov. 14, 2023 and entitled "Authentication Platform for Secure Access to Disparate Communication Networks", which claims priority to U.S. Provisional Patent Application No. 63/533,468, filed on Aug. 18, 2023 and entitled "Authentication Platform For Secure Access To Disparate Communication Networks", which are incorporated herein by reference in their entireties.

FIELD OF THE INVENTION

The present technology relates to the field of communication networks. More particularly, the present technology relates to machine learning based techniques to access interactive voice response systems for authentication and access to real time data maintained in a variety of secure networks.

BACKGROUND

In communication networks, authentication is a process that verifies the identity of a user or computer system before providing access to sensitive information. Authentication is often performed or controlled by an entity maintaining the sensitive information that is to be accessed. Proper authentication ensures that only authorized users or computer systems obtain access to protected data. Some entities utilize an interactive voice response system to automate authentication of their users.

SUMMARY

Various embodiments of the present technology can include systems, methods, and non-transitory computer readable media configured to perform operations comprising: receiving, by a computing system, a set of prompts from an interactive voice response (IVR) system of an institution during a session; providing, by the computing system, data associated with the set of prompts to one or more machine learning models trained based on training data; and based on the one or more machine learning models, generating, by the computing system, during the session a set of responses to the set of prompts for the IVR system to at least one of a) authenticate a user and b) access targeted account data maintained by the institution through the IVR system.

In some embodiments, the operations further comprise: generating a transcript associated with the session; and based on the one or more machine learning models, extracting targeted account data from the transcript.

In some embodiments, the one or more machine learning models include large language models (LLMs) fine tuned based on the training data, the training data generated by another LLM to which prompt engineering associated with authentication with and navigation of an IVR system to acquire targeted account data is applied.

In some embodiments, the training data comprises training examples including sequences having different numbers of prompt/response pairs.

In some embodiments, the training data comprises a training example including a first prompt equivalent to a second prompt, each of the first prompt and the second prompt associated with a corresponding common response.

In some embodiments, the training data comprises a training example including a first prompt for information and a corresponding first response including data, and a second prompt for the information and a corresponding second response of silence.

In some embodiments, the training data comprises a training example including a prompt for information that is not available and a response of silence.

In some embodiments, the training data comprises a training example including a first prompt for a type of information and a corresponding first response including a first instance of the type of information associated with a first time, and a second prompt for the type of information and a corresponding second response including a second instance of the type of information associated with a second time.

In some embodiments, the training data comprises a first sequence of prompt/response pairs to acquire a first type of targeted account data and a second sequence of prompt/response pairs to acquire a second type of targeted account data in a session.

In some embodiments, the one or more machine learning models include a first LLM associated with authentication with the IVR system, a second LLM associated with navigation of the IVR system to acquire targeted account data, and a third LLM associated with extraction of data from a transcript of the session.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the present technology.

BRIEF DESCRIPTION OF THE DRAWINGS

FIG. 6 illustrates an example method, according to an embodiment of the present technology.

Figure 1:
FIG. 1 illustrates an example system including an authentication platform, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

In communication networks, authentication is a process that verifies the identity of a user or computer system before providing access to sensitive information. Authentication is often performed or controlled by an entity maintaining the sensitive information that is to be accessed. Proper authentication ensures that only authorized users or computer systems obtain access to protected data. Some entities utilize an interactive voice response (IVR) system to automate authentication of their users as well as provide access to certain types of protected data.

A conventional IVR system implemented by an entity can function as an interface to receive a phone call from a user who is seeking certain information. The IVR system can present through verbal communication (or speech) a menu of options from which the user can select. The user can be prompted to select an option or provide information. The selection of the option or provision of information by the user can be communicated in a response constituting voice commands or by depressions of keys on the phone keypad. The IVR system can interpret the response. Based on the response, the IVR system in some instances can provide information sought by the user, after which the phone call can be concluded. Alternatively, based on the response, the IVR system can provide a second menu of options from which the user can select. Again, the user can be prompted to select an option or provide information. This process can continue until the information sought by the user is communicated by the IVR system to the user.

Conventional techniques to engage with an IVR system pose many significant disadvantages. When a user manually interacts with an IVR system of an entity with which the user has an account, the interaction can be inefficient and error ridden. For example, if a user desires a certain type of information relating to the account, the user may select options of or provide information to the IVR system in an attempt to navigate to the desired information. However, in some instances, navigation by the user of the IVR system can lead to undesired information. In other instances, the IVR system can be traversed in a manner that undesirably leads to the provision of no information or an abrupt end to the phone call. Thus, manual interaction with an IVR system in a conventional manner can be unreliable and frustrating to a user.

Apart from manual interaction involving a user, conventional software can be designed to engage with an IVR system. Conventional software typically follows a deterministic, rules-based approach. In this regard, when a prompt of an IVR system is recognized and understood, conventional software would determine a corresponding response based on an applicable rule and then automatically provide the response to the IVR system. However, IVR systems are not standardized, and can vary significantly in their design and operation. For example, IVR systems of two entities can be architected differently and accordingly reflect different menus of options, different ordering of prompts, and prompts for different types of information. Even when IVR systems of various entities prompt for the same type of information, the precise prompts employed to elicit that information may be different. In this regard, conventional software designed in a typical manner and intended to engage with IVR systems would lack the ability to properly account for such wide variation in the IVR systems. As a result, conventional software would fail to properly interpret and respond to prompts of IVR systems, preventing the reliable acquisition of desired information otherwise available through the IVR systems. The rules-based design of conventional software would preclude human-like navigation of IVR systems that can deftly and effectively respond in real time to unexpected or idiosyncratic behavior of IVR systems as they arise. Further, because of their rules-based design, the coding effort to appropriately scale conventional software to account for extensive discrepancies and uniqueness across a wide array of IVR systems would pose prohibitive cost.

An improved approach rooted in computer technology overcomes the foregoing and other disadvantages associated with conventional approaches specifically arising in the realm of computer technology. The present technology can advantageously utilize artificial intelligence and machine learning to enable automated, robust interaction with an IVR system. An authentication platform can authenticate a user. After authentication of the user, the authentication platform can facilitate authentication of the user with an entity, such as an institution, that maintains information about the user. For example, the user can have an account with the entity, and real time information relating to the account can be maintained by the entity in a secure network controlled by the entity. The entity can permit access to the real time account information through an IVR system, thus overcoming the disadvantages of conventional reliance on account data provided through, for example, periodic credit bureau reports or account statements that reflect stale data collected on a batch basis.

To acquire real time targeted account data maintained by the entity, the authentication platform can interact with the IVR system through a call provider. The call provider can serve as a communication intermediary by initiating a phone connection between the authentication platform and the entity. During a phone call between the authentication platform and the entity, voice (or speech) data in the form of a prompt can be provided by the IVR system to the authentication platform, and DTMF tones or voice data in the form of a response corresponding to the prompt can be provided by the authentication platform to the IVR system. In response to prompts by the IVR system requesting data to authenticate the user, the authentication platform can provide the requested data to authenticate the user. Once authenticated, the authentication platform can selectively navigate the IVR system by providing appropriate responses to prompts from the IVR system until the targeted account data is accessed through the IVR system. The authentication platform can generate a transcript of text data reflected in the prompts and the responses of the phone call. A data extraction can be performed on the transcript to extract all instances of targeted account data acquired through the phone call. Further, in some instances, implicit information inferred from the phone call can be determined.

Authentication of the user with the IVR system, appropriate navigation of the IVR system to access targeted account data, and extraction of targeted account data from a transcript of the phone call can be performed by one or more appropriately trained machine learning models or generative artificial intelligence (AI) models, such as large language models (LLMs). Fine tuning is discussed herein in various examples as a technique to tailor or customize machine learning models, such as pretrained (foundation) LLMs, to generate outputs enabling authentication, navigation, and data extraction in the acquisition of targeted account data. Notwithstanding. the present technology can utilize other techniques to optimize generation of LLM outputs as described herein. For example, various types of prompt engineering, prompt learning, parameter-efficient fine tuning, retrieval augmentation generation, and other techniques for enhancing the accuracy and reliability of generative AI models can be utilized based on, as suitably modified, the datasets and training data described herein. The one or more LLMs can function as an agent to seamlessly engage with the IVR system. As a result, the authentication platform can access and navigate IVR systems in a human-like manner to efficiently and successfully acquire real time targeted account data. More details relating to the present technology are provided herein.

FIG. 1 illustrates an example system 100 including an authentication platform 102, according to an embodiment of the present technology. The authentication platform 102 can authenticate users with the authentication platform 102. The authentication platform 102 also can support authentications with various entities or institutions, such as an institution 130. The authentication platform 102 can support authentication of a user with an entity to allow access to a secure network controlled by the institution in which protected data of the user is maintained. As an example, one type of protected data accessible through the authentication platform 102 can include account information of a user 110. The account information can relate to one or more accounts of the user 110 with one or more institutions. As just one example, the accounts can be associated with financial liabilities assumed by the user and the institutions can include financial institutions such as banks, credit unions, insurance companies, brokerage firms, lenders, and investment dealers.

A mobile phone (or other client computing device) 108 associated with the user 110 can allow the user 110 to communicate with the authentication platform 102. A third party application 104 controlled by a service provider can run on the mobile phone 108. The service provider can be any entity that provides services that may be useful for the user 110. The service provider can be, for example, a customer or partner of an entity in control of the authentication platform 102. For example, the service provider can perform or offer financial services (e.g., lending services, refinancing services, loan consolidation services, credit card services, etc.) for the user 110. The third party application 104 can include an embedded component (or utility) 106 supported and controlled by the authentication platform 102. The embedded component 106 can prompt the user 110 to provide identification information, such as selected types of personally identifiable information (PII), to authenticate the user 110 with the authentication platform 102.

The authentication platform 102, through a call provider 120, can communicate with an interactive voice response (IVR) system 132 of the institution 130. The authentication platform 102 can interact with the IVR system 132 to access account information of the user 110 maintained by the institution 130. The call provider 120 can be a service that acts as an intermediary supporting communications between the authentication platform 102 and the institution 130. For example, the call provider 120 can be a cloud communications platform that provides application programming interfaces (APIs) for supporting communications across different networks. The call provider 120 can receive voice (speech) data from the IVR system 132 of the institution 130 and convey the voice data to the authentication platform 102. The call provider 120 also can receive DTMF tones or voice data from the authentication platform 102 and convey the DTMF tones or voice data to the IVR system 132 of the institution 130. The authentication platform 102 can interact with the IVR system 132 to support authentication of the user 110 with the institution 130 and to obtain certain or targeted account data maintained by the institution 130. The provision of protected information (e.g., PII) of a user, authentication of the user, and acquisition of targeted account data associated with the user by the authentication platform 102 can be performed only after consent of the user.

The authentication platform 102 can train (or customize) and utilize machine learning models, such as one or more large language models (LLMs), to generate outputs to appropriately engage with the IVR system 132. The authentication platform 102 can determine and convey through the call provider 120 appropriate responses to prompts provided by the IVR system 132 to successfully authenticate the user 110 and acquire the targeted account data. The IVR system 132 of the institution 130 is an example representative of a wide array of disparately architected and implemented IVR systems utilized by any number of different institutions. In accordance with the present technology, the authentication platform 102 is configured and designed to robustly and effectively interact with such IVR systems no matter their specific architecture or operation. More details regarding the authentication platform 102 are provided herein. While some examples discussed herein involve a phone call with an IVR system as illustrations, the present technology can apply to other contexts and scenarios involving different types of interactive sessions. The authentication platform 102 can support interaction with various communication interfaces provided by institutions to access account data through various types of interactive sessions. For example, the authentication platform 102 can support engagement with communication interfaces provided by institutions based on text, messaging, virtual reality, augmented reality, and mixed reality. Responses to prompts can be provided by the authentication platform 102 in a manner consistent with the type of communication interface provided by an institution so that targeted account data can be obtained during a session involving interaction with the communication interface. In addition, while some examples discussed herein reflect English language usage, the present technology can apply to IVR systems or other communication interfaces that utilize any language.

Communications among the authentication platform 102, the third party application 104, the embedded component 106, the mobile phone 108 of the user 110, the call provider 120, the institution 130, and other entities can occur over a suitably configured communication network. The communication network can include any suitable communication medium or protocol supporting remote communication with the authentication platform 102. Application programming interfaces (APIs) supported by servers or backend systems of the authentication platform 102, the call provider 120, the institution 130, and other entities can support exchange of information, as described herein.

In some embodiments, the authentication platform 102 can be implemented by a server system. In some embodiments, some of the functionality of the authentication platform 102 can be performed by an application associated with the authentication platform 102 and running on a client computing device of a user. In some instances, the application can be or include a component or utility embedded in a different application controlled by a service provider in communication, collaboration, or partnership with the authentication platform 102. In some embodiments, the functionality of the authentication platform 102 can be distributed between a server and an application running on a client computing device. Although the present technology is sometimes herein described in relation to a platform for authentication to access financial account information for purposes of illustration, the present technology can apply to an authentication platform to access any type of protected data or any type of account with an institution that is maintained in a secure network controlled by the institution. In some instances, the system 100 can include at least one data store (not shown) in communication with or integrated into the authentication platform 102. The data store can maintain information required to support operation of the authentication platform 102. For example, the data store can maintain information about users and their accounts with different institutions. The maintained information can include, for example, identification information associated with users; institutions with which users may have accounts; account information; graphs representing users, institutions, identification information and account information; reports and information provided by various resources; machine learning models to facilitate authentication of users with various institutions; machine learning models to navigate IVR systems of institutions; machine learning models to extract data obtained from IVR systems; training data to train or fine tune machine learning models; a prompt library for machine learning models to generate training data; and other information discussed herein that support operation of the authentication platform 102. The authentication platform 102 can implement various protections to safeguard data that is received or maintained, such as SOC (Service Organization Control) compliance and PCI (Payment Card Industry) compliance.

Figure 2:
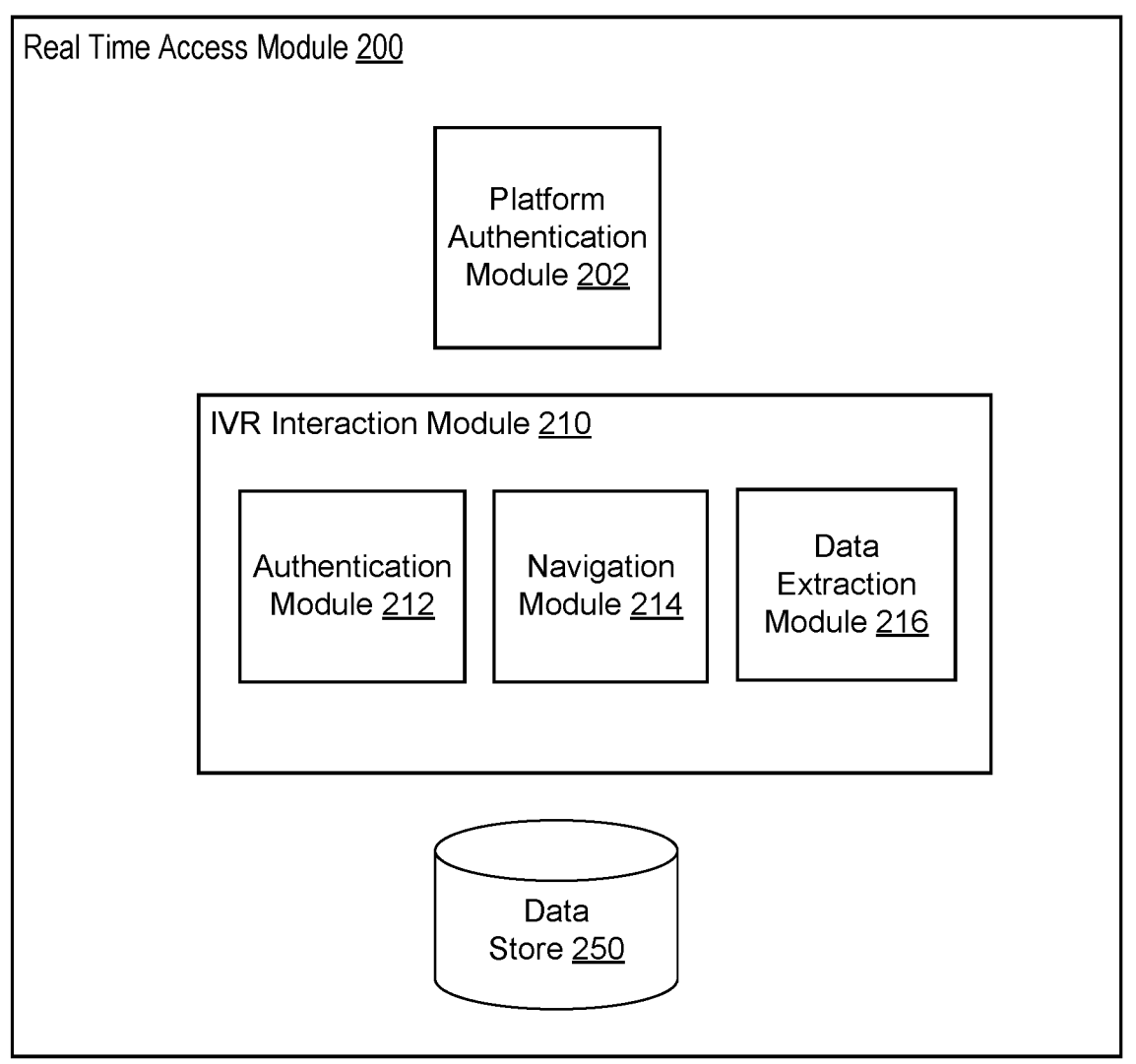
FIG. 2 illustrates an example real time access module, according to an embodiment of the present technology.

FIG. 2 illustrates an example real time access module 200, according to an embodiment of the present technology. In some embodiments, the authentication platform 102 can implement the real time access module 200. The real time access module 200 can receive identification information provided by a user, such as the user 110. Based on the identification information, the real time access module 200 can automatically perform authentication with the authentication platform 102 as well as support authentication with various institutions, such as the institution 130, that maintain protected data of the user in various accounts. The real time access module 200 can support authentication with the institutions and acquire protected data maintained in secure networks of the institutions through machine learning techniques. For example, one or more LLMs can provide appropriate responses to prompts provided by an IVR system of an institution to facilitate authentication of the user with the institution and to acquire targeted account data maintained by the institution. The real time access module 200 can include a platform authentication module 202 and an IVR interaction module 210. The IVR interaction module 210 can include an authentication module 212, a navigation module 214, and a data extraction module 216. The real time access module 200 also can include a data store 250 that maintains PII information and various types of account information of users. The information maintained in the data store 250 can be encrypted and otherwise protected to optimize data security. The components (e.g., modules, elements, features, store, functionality, operations, etc.)

shown in this figure and all figures herein are exemplary only, and other implementations may include additional, fewer, integrated, or different components. Some components may not be shown so as not to obscure relevant details. In various embodiments, one or more of the functionalities described in connection with the real time access module 200 or its components can be implemented in any suitable combinations.

The platform authentication module 202 can obtain information from various resources (e.g., mobile network operators, data sources, agencies, etc.) that can be utilized to authenticate the user with the authentication platform 102 and with various institutions maintaining protected data of the user. The platform authentication module 202 can obtain identification information (e.g., PII) provided by a user and authenticate the user with the authentication platform 102 and with various institutions without affirmative provision by the user of any additional identification information. For example, the identification information can include certain types of identification information provided by the user, such as certain types of PII of the user. For instance, the certain types of identification information provided by the user can include the name of the user and the mobile phone number of the user. In some embodiments, the certain types of identification information provided by the user are limited to only the name of the user and the mobile phone number of the user. In some embodiments, the identification information provided by the user is limited to and does not exceed a predetermined number of types of identification information. For example, the identification information provided by the user can be limited to two types of PII (e.g., name and mobile phone number), or three types of PII (e.g., name, mobile phone number, and SSN), or some other selected number of types of PII. In some embodiments, after provision or entry by the user of the selected number of types of identification information, no other identification information or other type of identification information is requested or required from the user, or provided or entered by the user, to authenticate the user for the authentication platform 102 and for accounts with various institutions maintaining protected data of the user within their respective secure networks. In some embodiments, after provision by the user of the selected number of types of identification information, and without provision by the user of additional types of identification information, the authentication platform 102 can present to the user identification information associated with the user merely to request confirmation by the user of the correctness of the identification information.

The identification information provided by the user can be acquired by the authentication platform 102 through an embedded component associated with the authentication platform 102, such as the embedded component 106. The embedded component can be integrated in or part of a separate application, such as the third party application 104, provided by a service provider. For example, the separate application can be running on a client computing device, such as the mobile phone 108, of the user. Based on the embedded component, the mobile phone can access a server system associated with the authentication platform 102 through internet access provided to the mobile phone by a mobile network operator.

The platform authentication module 202 can prompt the mobile network operator based on the identification information provided by the user to perform a verification and a silent network authentication (SNA). For example, in response to receipt of the name and the mobile phone number provided by the user, and with the consent of the user, the platform authentication module 202 in real time can request the mobile network operator to verify that the mobile phone number is correctly associated with (or belongs to) the name. Further, the platform authentication module 202 can request the mobile network operator to verify that the mobile phone number provided by the user is the same mobile phone number that accessed or communicated with the backend or server system (e.g., web server) of the authentication platform 102. Such verifications can be utilized in authentication of the user. In addition, with consent provided by the user, the platform authentication module 202 can obtain from the mobile network operator additional PII associated with the user, such as date of birth, address, or the like. For example, consent of the user can be provided through the embedded component.

The platform authentication module 202 can obtain information from various data sources. The identification information associated with the user, including the identification information provided by the user and the identification information obtained from the mobile network operator, can be provided by the platform authentication module 202 to the data sources. A data source can include, for example, an identity verification provider. Based on the identification information associated with the user, the data source can perform, for example, various searches and checks on the user, such as KYC (Know Your Customer) or AML (Anti-Money Laundering) related diligence. Information relating to the results of such searches and checks in relation to the user can be included in a report that is provided from the data source to the platform authentication module 202. A report from a data source can contain different types of information, or features, regarding a user that can inform a decision regarding whether to authenticate the user. Different data sources can provide different types of information about the user to the platform authentication module 202.

The types of information provided by the data sources can include, for example, various types of information associated with the user. The types of information provided by the data sources can include PII of the user including, for example, an address of the user, a date of birth of the user, a social security number of the user, and the like. In addition, the types of information provided by the data sources can include, for example, features relating to mobile phone statuses associated with the user. For example, the types of information can indicate that the user acquired a new SIM or new mobile phone and the date of the acquisition, that the mobile phone has been stolen, that the mobile phone has been disabled or enabled, and the like. Further, the types of information provided by the data source can include, for example, features relating to matching and mismatching between the identification information provided by the user and corresponding information maintained or discovered by the data source. For example, as discussed, the identification information provided by the user can include the name and the mobile phone number of the user. In this example, the types of information provided by the data source can include an indication that the mobile phone number provided by the user is different from a mobile phone number for the user as independently determined by the data source. As another example, the types of information provided by the data source can include an indication that an SSN provided by the user is the same as an SSN for the user as independently determined by the data source. As yet another example, the types of information provided by the data source can include an indication that an address provided by the user is different from an address for the user as independently determined by the data source. The types of information provided by the data source also can include, for example, an indication of an absence of records or data accessible by the data source that correspond to identification information provided by the user and a related indication that the accuracy of the identification information provided by the user was not able to be verified by the data source.

Further, the types of information provided by the data source can include, for example, scores. A score can be associated with each feature (or characteristic) provided in a report by the data source. In some instances, a score associated with a particular feature can indicate an estimate regarding the probability of the feature. For example, the score can be a first value (e.g., value of 0) indicating low probability or a second value (e.g., value of 1) indicating high probability. As just one example, the data source can provide to the platform authentication module 202 a score for a feature corresponding to a mismatched address of the user. In this example, the score for the feature is an indication by the data source of a probability that the address of the user is mismatched.

In addition, the types of information provided by the data source can include, for example, a risk code (or risk tag). The data source can provide to the platform authentication module 202 a variety of risk codes that describe or indicate discovered statuses, conditions, or activities associated with the user. In some instances, the risk codes can describe legality, propriety, or risk in a potential relationship or interactions with the user. For example, a risk code can indicate that the user appears in an OFAC (Office of Foreign Asset Control) list (e.g., SDN List (List of Specially Designated Nationals and Blocked Persons), NS-MBS List (Non-SDN Menu-Based Sanctions List), etc.). As another example, a risk code can indicate that the mobile phone number of the user is associated with an IP address linked to a country sanctioned by OFAC. As yet another example, risk codes can indicate that identification information provided by the user and corresponding information accessible by the data source do not match (e.g., phone numbers are mismatched, last names are mismatched, etc.).

The platform authentication module 202 can obtain information from various agencies. The identification information provided by the user as well as the other identification information obtained by the platform authentication module 202 can be provided by the platform authentication module 202 to an agency. For example, an agency can include a credit reporting bureau or reporting agency. The agency can return a report for the user. The report can include various types of information, such as details about tradelines and liability accounts of the user, institutions associated with the liability accounts, public records such as bankruptcies involving the user, and a list of institutions that have asked to see the report of the user. In addition, the report can contain various fraud alerts and other flags concerning the user, such as an indication that the identity of the user has been reported as threatened or stolen.

The platform authentication module 202 can determine a security risk level associated with the user to inform whether the user can be (or should be) authenticated with the authentication platform 102. The platform authentication module 202 can implement a risk scoring technique to generate an aggregate risk score associated with the user. The aggregate risk score can indicate a risk level associated with the user that informs whether the user can be authenticated with the authentication platform 102. The risk scoring technique can include an aggregation of various terms associated with certain types of information obtained by the platform authentication module 202. A term can correspond with a feature associated with a selected type of information provided by a mobile network operator or a selected type of information from the reports provided by the data sources and agencies. The aggregation can be, for example, an average, sum, or other combination or calculation involving component scores that correspond to the individual terms.

For example, the risk scoring technique can include terms corresponding to features relating to whether the mobile network operator has verified the association between the mobile phone number and the name provided by the user and whether the mobile network operator has verified possession of the mobile phone through SNA, as discussed herein. As another example, the risk scoring technique can include terms corresponding to features relating to mismatches (or matches) in the PII of the user, such as a mismatched name of the user, a mismatched address of the user, etc. In some instances, mismatched identification information can be determined by a data source alone. In some instances, mismatched identification information can be determined by the platform authentication module 202. For instance, the platform authentication module 202 may receive inconsistent indications or values for a particular type of identification information (e.g., SSN, address, etc.) from a data source versus from an agency. As yet another example, the risk scoring technique can include terms corresponding to features relating to the status of the mobile phone of the user, such as whether the mobile phone was recently stolen, whether the mobile phone is disabled, etc. As indicated, the features used in the risk scoring technique can be a selection, or portion, of all features (or characteristics) set forth in the information provided by the resources. The features can be selected by the authentication platform 102 based on their importance in contributing to an accurate determination of a security risk level that informs whether to authenticate the user.

In some embodiments, the platform authentication module 202 can cause a machine learning model (e.g., neural network) to generate the weights to be applied to features to determine component scores for corresponding terms in the risk scoring technique. Based on training data, the machine learning model can be trained to generate the weight for each feature selected for inclusion in the risk scoring technique. The training data can be generated based on a variety of techniques. For example, training data can be generated from manual determinations of weights for features. The manual determination of weights for features in accordance with a deterministic model, can be accumulated and used as training data to train the machine learning model. During a training phase, a particular weight value can be assigned to a particular feature based on the relative importance of the feature in generating an accurate aggregate risk score. In some instances, during the training phase, a weight value associated with a feature can change as the importance of the feature changes. Accordingly, the weight for a feature can change during an evaluation phase based on the machine learning model. For example, assume that a feature relates to an address mismatch. In one instance, the address mismatch can have a first weight value. In another instance, information provided by a data source can indicate that the user recently moved residences. As a result, in this instance, the address mismatch can have a second weight value (e.g., a value of 0) that is less than the first weight value. In some embodiments, the weights generated by the machine learning model can be subject to an independent analytical check. For example, the platform authentication module 202 can determine whether the weights are within predetermined ranges that constrain the values of weights. If a generated weight falls outside a predetermined range associated with the weight, the weight can be reconfigured to have a value that falls inside the predetermined range. Further, the machine learning model can be retrained based on the reconfigured weight. Many variations are possible.

Based on the aggregate risk score, the platform authentication module 202 can determine a risk level for the user. In some embodiments, the risk level can be a binary designation, such as a first designation of risk (e.g., high risk level) or a second designation of risk (e.g., low risk level). A designation of high risk can be associated with a determination by the platform authentication module 202 that the user cannot (or should not) be authenticated and a designation of low risk can be associated with a determination by the platform authentication module 202 that the user can (or should) be authenticated. In some embodiments, in the event the aggregate risk score results in a designation of risk that is unclear or indeterminate, the platform authentication module 202 can take further action to attempt to determine the identity the user. For example, the platform authentication module 202 can repeatedly prompt the user to provide additional identification information (e.g., such as PII) and, based on the additional identification information, determine additional aggregate risk scores, or update the aggregate risk score, until an aggregate risk score results in "high risk" or "low risk". Many variations are possible.

After authentication of a user with the authentication platform 102, the IVR interaction module 210, after receipt of consent by the user, can engage in real time with an IVR system of an institution to authenticate the user with the institution and to obtain targeted account data maintained by the institution in a protected network. The IVR interaction module 210 can interact with the IVR system in a manner that faithfully mimics or simulates human interaction with the IVR system. Targeted account data can be any information maintained by the institution that is sought by, for example, the user, the authentication platform 102, or a service provider. Targeted account data can include desired financial data relating to an account. Desired financial data can include, for example, account balance, payment due date, minimum payment, minimum payment due date, loan payoff amount, past due amount, interest rate, and the like.

The need for targeted account data can arise in a variety of contexts. For example, the user may wish to know the current account balance on an account in preparation for a next payment. In this example, the user can trigger engagement by the authentication platform 102 with the IVR system of the institution to access the targeted account data. For instance, the user can trigger such engagement through an appropriate selection or other command provided through the embedded component integrated in the third party application associated with a service provider or through the third party application that is in communication with the authentication platform 102. Upon receipt of the command, the authentication platform 102 can initiate engagement with the IVR system of the institution to obtain the current account balance for the user. As another example, the authentication platform 102 can seek the current account balance on the account to determine a profile for the user. For instance, the profile of the user can classify the user as a transactor, revolver, or dormant. Based on the profile, the authentication platform 102 can apprise the user of suitable financial products or services, or related promotional materials, that would be relevant to the user. In addition, the authentication platform 102 can communicate the profile of the user to other service providers who, based on the profile, can offer appropriate financial services for the user. As yet another example, a service provider associated with the third party application can seek the current balance or a payoff amount on the account. This information can be sought to determine whether the user potentially qualifies for a particular loan consolidation product or refinance opportunity offered by the service provider and thus whether to inform the user about the loan consolidation product or refinance opportunity. The foregoing are merely examples. Any type of account data can be likewise targeted by the IVR interaction module 210 for access through the IVR system.

Upon initiated engagement of the authentication platform 102 with the IVR system of the institution, the IVR interaction module 210 can interact with the IVR system to obtain targeted account data. The IVR interaction module 210 and, in particular, the authentication module 212 and the navigation module 214, can receive prompts from the IVR system through a call provider. A prompt can include, for example, a menu of options, a request for information, a question, an instruction, a statement, account data (e.g., targeted account data), or any combination thereof. Prompts can be conveyed from the IVR system as voice data. The IVR interaction module 210 can receive the voice data from the IVR system and convert the voice data to text data. Conversion of the voice data to text data can be performed by any suitable speech-to-text technique, including utilization of machine learning models trained to convert voice data to text data. In some instances, a machine learning model (e.g., LLM) that is pretrained to convert voice data to text data can be fine tuned with data that includes commonly used prompts and related verbiage of a variety of IVR systems along with corresponding text conversions. Such data to fine tune a machine learning model can include a vocabulary of common terms reflected in prompts of IVR systems of different institutions as well as specific terms used by different institutions to name various types of account data.

The IVR interaction module 210 can analyze the text data to interpret the prompts provided by the IVR system and to appropriately generate responses to the prompts. The IVR interaction module 210 can parse voice data and associated text data into discrete prompts constituting separate utterances. Identification of separate utterances, or prompts, can be based on, for example, pauses in the voice data. For example, the IVR interaction module 210 can utilize a selected pause duration (e.g., 600 milliseconds) in voice data to identify the conclusion of a prior utterance and the beginning of a next utterance. Voice data that is separated by less than the selected pause duration can be considered part of the same utterance. The IVR interaction module 210 can determine an appropriate response for each identified utterance. In some embodiments, the IVR interaction module 210 does not convert voice data from the IVR system to text data. The IVR interaction module 210 can directly analyze the voice data to interpret the prompts provided by the IVR system and appropriately generate responses to the prompts. As discussed in more detail herein, the IVR interaction module 210 can utilize one or more machine learning models (e.g., large language models) to support generation of responses to prompts.

A response to a prompt can be or include, for example, identification information, a selection of an option, a navigation command, a statement of intent, responsive data, silence, or any combination thereof. For example, a response can include data that is maintained by the authentication platform 102 (e.g., account data) or can include data not maintained by the authentication platform 102 (e.g., a selection of an option from a menu of an IVR system, intent to obtain targeted account data). In some instances, a response can be silence (e.g., no DTMF tones and no voice data) when, for example, the IVR interaction module 210 determines that information responsive to a prompt is not available or does not exist. In addition, a response can be silence when the IVR system has provided a second prompt for information in quick succession after a first prompt for the same information. In such an instance, the IVR system may have failed to properly receive or process a provided response to the first prompt. The failure can be due to, for example, processing error committed by the IVR system, or latency or data loss issues associated with a communication network over which the response to the first prompt was provided to the IVR system. Because repeated provision of the same response for the second prompt can potentially cause error in the operation of a conventional IVR system, the response to the second prompt can be silence. In some instances, a response can be silence when the IVR interaction module 210 determines that information responsive to a prompt should not be provided to the IVR system. In some instances, a response can be termination of a call with the IVR system when a prompt or other indication from the IVR system indicates that further interaction with the IVR system would be inconsistent with or unhelpful to the acquisition of targeted account data. For example, if, through the IVR system, a live agent (person) will or does appear during a call, the IVR interaction module 210 can terminate the call. Many variations are possible.

When data is to be provided in responses, the IVR interaction module 210 can provide the responses as DTMF tones, voice data, or a combination of both. A response to a prompt can be in the form of DTMF tones when the prompt indicates that a response should be in the form of DTMF tones (e.g., "Press '2' if you would like your current interest rate."). A response to a prompt can be in the form of voice data when the prompt indicates that the response should be in the form of voice data (e.g., "Tell me what you would like to do today."). In some instances, a response can be converted from text data to voice data by the IVR interaction module 210 before the response is provided to the IVR system. When a prompt indicates that a response can be in the form of either DTMF tones or voice data (e.g., "If you would like to know your loan payoff amount as of today, press or say '3'"), the IVR interaction module 210 can select that the response be in the form of DTMF tones or voice data based on various considerations. For example, the IVR interaction module 210 in some instances may select provision of DTMF tones instead of voice data to optimize data clarity, reduce computing expense, or minimize the impact of background or ambient noise. In some instances, the IVR interaction module 210 can provide a response to a call provider, which in turn can pass through the response to the IVR system. In some instances, the IVR interaction module 210 can provide instructions for the call provider to convert the response to another format (e.g., to voice data, to DTMF tones) before providing the response to the IVR system.

Figure 3:
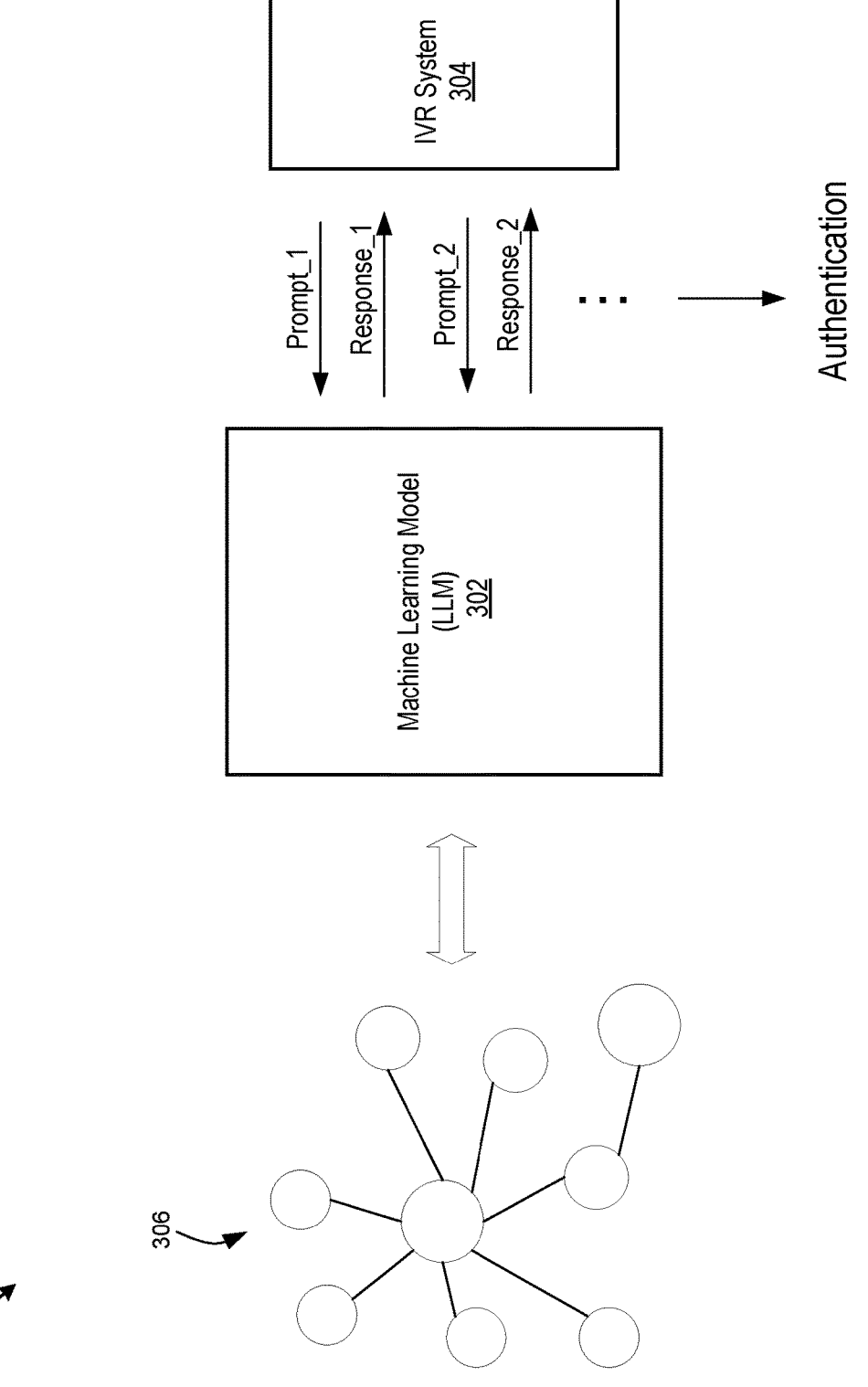
FIG. 3 illustrates an example functional block diagram associated with authentication, according to an embodiment of the present technology.

The authentication module 212 of the IVR interaction module 210 can respond to prompts of IVR systems of institutions to support authentication of users with the institutions. In some embodiments, the authentication module 212 can implement or utilize a machine learning model to determine appropriate responses to prompts to authenticate users. FIG. 3 illustrates an example, simplified functional block diagram 300 relating to interaction with an IVR system to authenticate a user based on a machine learning model 302 that can be utilized by the authentication module 212. For example, the machine learning model 302 can be a large language model (LLM) trained (e.g., fine tuned) to support authentication of users through various IVR systems of institutions maintaining targeted account data. The IVR system can prompt for information. For example, the IVR system can prompt for identification information (e.g., last four digits of SSN, mother's maiden name, passcode, account number, etc.). Upon receipt of a first prompt from the IVR system (e.g., "Hi, please provide your social security number."; "Do you have your account number?"), the IVR interaction module 210 can convert the voice data of the first prompt to text data based on a suitable speech-to-text technique. The text data can be provided to the machine learning model 302 and an output can be generated by the machine learning model 302. For example, the output can be a function call for particular type of data maintained by the authentication platform 102 that is responsive to the first prompt. The responsive data can be retrieved by the authentication platform 102 through an appropriate search or traversal of the data store 250 maintained by the authentication platform 102. The data store 250 can be represented as a graph 306 of data relating to a user, including identification information and account data associated with the user. In some instances, the authentication platform 102 can transform or modify the responsive data to satisfy the requirements of the first prompt. As just one example, if the first prompt is for the last four digits of a SSN, and if the authentication platform 102 maintains the entire SSN of a user, the authentication platform 102 can truncate the entire SSN to generate the last four digits of the SSN as a first response (e.g., "xxxxx1234") to the first prompt. As another example, the output can be a response that is not maintained in the data store 250. For instance, the output can be the selection of an option from a menu of options communicated in the first prompt. As another instance, the output can be a response indicating an intent to authenticate with the IVR system (e.g., "I know my account number.") or an instruction to authenticate with certain identification information (e.g., "I know my mother's maiden name.").

Through the call provider, the authentication platform 102 can convey the first response to the IVR system as DTMF tones or voice data. Upon receipt of the first response, the IVR system can provide a second prompt for additional information. In a manner similar to handling of the first prompt, the authentication module 212 can convert the voice data of the second prompt to text data based on a suitable speech-to-text technique. The text data can be provided to the machine learning model 302 and an output can be generated by the machine learning model 302. For example, the output can be a function call for a particular type of data maintained by the authentication platform 102 that is responsive to the second prompt. The responsive data can be retrieved by the authentication platform 102 through an appropriate search or traversal of the data store 250 represented as the graph 306. The responsive data can be conveyed, through the call provider, to the IVR system as a second response constituting DTMF tones or voice data. The machine learning model 302 can repeatedly generate outputs to provide as responses to successive prompts of the IVR system in this manner until authentication of the user has concluded successfully. In some instances, the IVR system can indicate successful authentication of the user with a corresponding prompt (e.g., "How can I help you today?").

The machine learning model 302 can be trained to generate outputs associated with responses to prompts from different IVR systems of various institutions to authenticate users with the institutions. In some embodiments, the machine learning model 302 can be provided or trained by the entity in control of the authentication platform 102. In some embodiments, the machine learning model 302 can be a generative machine learning model, such as a large language model (LLM). In some embodiments, the machine learning model (LLM) 302 can be a generalized or pretrained (or base) LLM that is made available (e.g., open sourced) by a third party entity and further fine tuned (e.g., supervised learning, reinforcement learning) by the entity in control of the authentication platform 102.

Various techniques can be utilized to generate datasets as training data to fine tune the machine learning model (LLM) 302. For example, a dataset can be generated through another machine learning model, such as another pretrained LLM. The LLM can be proprietary or open sourced. In some instances, prompt engineering can be applied to the LLM so that the LLM can achieve higher quality results and more effective outputs to successfully authenticate users with IVR systems and their associated institutions. The LLM can be provided with various prompts of IVR systems and can output responses to the prompts. The sequence of prompts and responses can constitute a dataset. As another example, a dataset can be generated by providing to another pretrained LLM in an unsupervised manner various prompts to cause the LLM to output corresponding responses based on selected temperature values. Each series of prompts and corresponding responses can constitute a dataset. As yet another example, a dataset can be generated manually by deterministically specifying responses to various prompts of IVR systems in a manner that traverses IVR systems to authenticate users. As yet a further example, a dataset can be generated by hardcoding responses to prompts of IVR systems based on string or text matching. The generated datasets can be appropriately labeled or annotated (e.g., positive examples, negative examples, continuous grading, categorical labels) based on their effectiveness in progressing through IVR systems to successfully authenticate users with the related institutions. The datasets can be utilized for fine tuning so that parameters of the machine learning model (LLM) 302 are adjusted to allow the machine learning model (LLM) 302 to excel in the specific task of user authentication with IVR systems.

Datasets can be generated as training data so that the machine learning model (LLM) 302 can be fine tuned to effectively interact with different IVR systems of various institutions. For example, a dataset can be generated in a manner that is tailored to the unique design and implementation of a particular IVR system of a given institution or a related class of IVR systems with common or similar design and implementation. As a result, the machine learning model (LLM) 302 can effectively maneuver through the particular IVR system or related class of IVR systems in accordance with their unique designs and implementations to achieve authentication of users. In this manner, the machine learning model (LLM) 302 can be further fine tuned based on datasets dedicated to different IVR systems to increase the robustness of the machine learning model (LLM) 302 to handle disparities among different types of IVR systems. Through such fine tuning, the machine learning model (LLM) 302 can be capable of effectively providing responses to prompts even from IVR systems for which it has not been specifically fine tuned or otherwise trained or customized. In some embodiments, instead of a single machine learning model (LLM) 302 to support authentication of users, the authentication module 212 can utilize an array of machine learning models (LLMs) to handle authentication with different IVR systems of various institutions. For example, a unique machine learning model (LLM) can be dedicated to the IVR system of a particular institution. In this example, each machine learning model (LLM) can be separately trained or fine tuned with datasets that are tailored to the particular design and operation of the corresponding IVR system.

In some embodiments, training data (e.g., input-output pairs) to fine tune the machine learning model (LLM) 302 can include sequences of prompts and corresponding responses as datasets. To account for prompts seeking different types of identification information, the training data can include, for example, prompts for different types of identification information (e.g., SSN, mother's maiden name, postal code, account number, etc.) and corresponding responses. In this way, responses can be appropriately generated by the machine learning model (LLM) 302 for any IVR system following any authentication protocol requiring any types of identification information. To account for authentication protocols of IVR systems that require different amounts of identification information, the training data can include, for example, different numbers of prompt/response pairs. To consistently provide responses to variations in prompt expression that have substantially the same meaning (e.g., "account number", "account ID"), the training data can include, for example, synonymous or equivalent prompts along with their corresponding common response. To account for successive prompts for the same information and to avoid repeated provision of the same response so as to avoid error in the operation of an IVR system, the training data can include, for example, a first prompt for data and a corresponding first response including responsive data, and a second prompt for the data and a corresponding second response of silence. To account for the absence of responsive information, the training data can include, for example, a first prompt for information and a corresponding first response of silence. In this regard, fine tuning an LLM with such training data overcomes problems associated with the tendency of conventional LLMs to generate data as an output even when the output is incorrect or otherwise in the absence of sufficient confidence to generate the output. To account for a prompt seeking information that is inappropriate to provide to an institution (e.g., income), the training data can include, for example, a prompt for inappropriate information and a response of silence. To account for a prompt seeking identification information about a user who will be undesirably taken directly to a live agent based on a type of profile or status of the user, the training data can include, for example, a prompt for identification information of a user with a selected type of profile or status and a response of silence along with an instruction for the authentication platform 102 to end the session. To account for the presence of different information (e.g., time series data) that are potentially responsive to a prompt seeking particular data maintained by an institution (e.g., data at a certain time), the training data can include, for example, a series of prompt-response pairs to iteratively elicit responses until provision of the particular data in a response. Empowering the machine learning model (LLM) 302 in this situation can allow authentication with an institution when the institution maintains stale data about the user and does not maintain fresh data about the user. For example, training data can include a prompt for particular information of a certain type (e.g., certain prior address) and a corresponding response including a most recent instance of the type of information (e.g., current address); when the response is not accepted, a second prompt for the particular information and a second corresponding response including a second most recent type of information (e.g., last address); when the second response is not accepted, a third prompt for the particular information and a corresponding third response indicating a third most recent type of information (e.g., penultimate address), and so on until a response includes the particular information (e.g., certain prior address). To conclude a call because the prospect of a real person (or live agent) appearing on the call arises, the training data can include, for example, a prompt for information and a corresponding response indicating the absence of the information; a second prompt for information and a second corresponding response indicating the absence of the information; and, a third prompt indicating that a real person will join the call and a third corresponding response of silence along with an instruction for the IVR interaction module 210 to end the call. To account for prompts and corresponding responses that do not lead to targeted account data or otherwise result in a failed effort, the training data can include, for example, different series of prompt-response pairs and corresponding labels or annotations that the series result in failures to authenticate (or exceptions). Many variations are possible.

Figure 4:
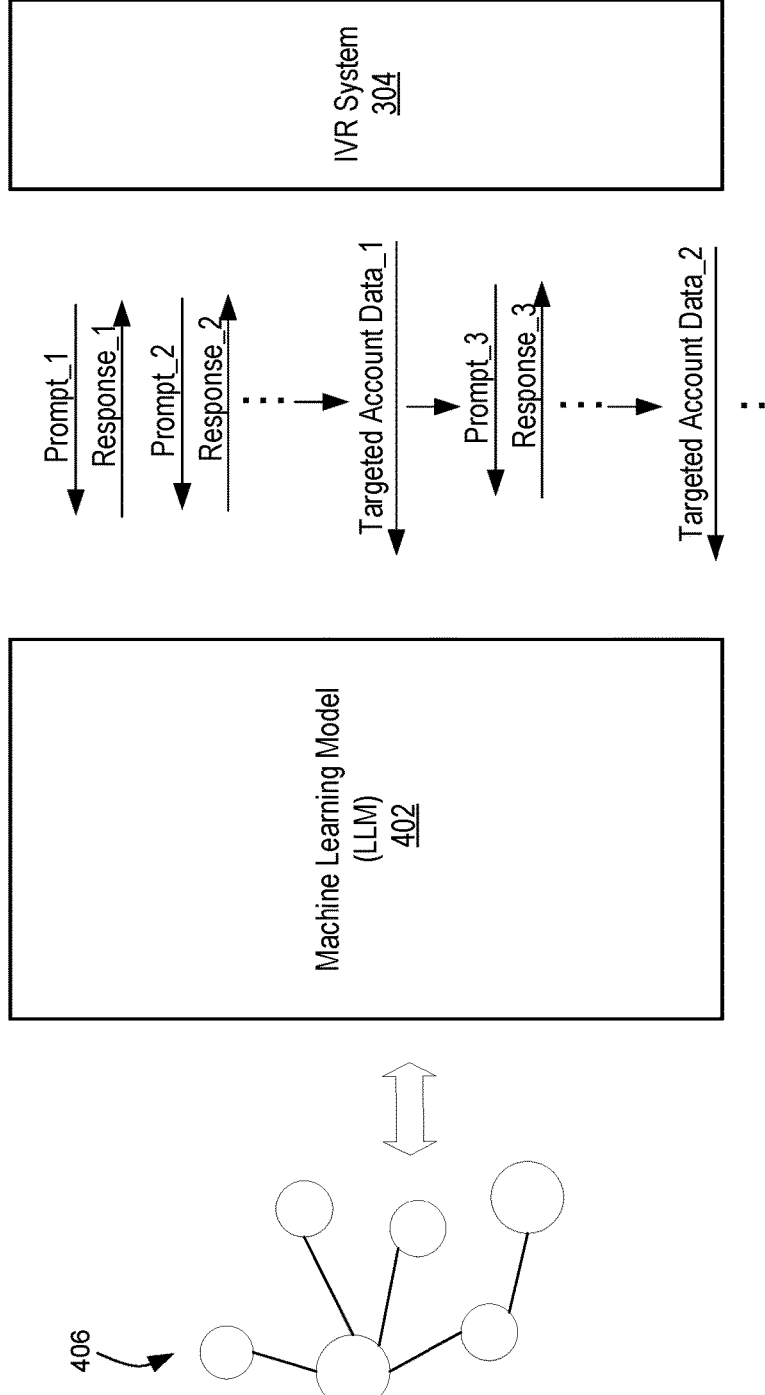
FIG. 4 illustrates an example functional block diagram associated with navigation, according to an embodiment of the present technology.

Upon an indication by the IVR system that a user has been successfully authenticated with an institution, the navigation module 214 of the IVR interaction module 210 can be utilized to respond to prompts of the IVR system to access targeted account data. The navigation module 214 can support acquisition of targeted account data associated with the user and maintained by the institution. FIG. 4 illustrates an example, simplified functional block diagram 400 relating to interaction with an IVR system to access or acquire targeted account data based on a machine learning model 402 that can be utilized by the navigation module 214. For example, the machine learning model 402 can be a large language model (LLM) trained (e.g., fine tuned) to support optimal navigation through various IVR systems of different institutions for acquisition of targeted account data. As discussed, targeted account data can be any kind of account data maintained by an institution and sought by, for example, the user, the authentication platform 102, or a service provider. The IVR system can prompt for information. For example, the IVR system can communicate in a prompt a menu of options (e.g., "What would you like to do?Say or press '1' to get balance related information. Say or press '2' to get payment history information. Say or press '3' to get . . . ") from which an option can be selected by the machine learning model 402 as a response. As another example, the IVR system can pose in a prompt an open ended question (e.g., "How I can help you today?") to which an answer (e.g., "I want to know tomorrow's loan payoff amount including interest.") can be determined by the machine learning model (LLM) 402 as a response. As yet another example, the IVR system can provide in a prompt targeted account data along with options or questions (e.g., "Your account balance is $435.29. Say or press '1' to return to the main menu."; "Your loan payoff amount is $51,439.15. What would you like to do next?"). As discussed, upon receipt of a first prompt from the IVR system, the IVR interaction module 210 can convert the voice data of the first prompt to text data based on a suitable speech-to-text technique. The text data can be provided to the machine learning model 402 and an output can be generated by the machine learning model 402. For example, the output can be a function call for particular type of data maintained by the authentication platform 102 that is responsive to the first prompt. The responsive data can be accessed or retrieved by the authentication platform 102 through an appropriate search or traversal of the data store 250 maintained by the authentication platform 102. The data store 250 can be represented as a graph 406 of data relating to a user, including identification information and account data. As another example, the output can be a response that is not maintained in the data store 250. For instance, the output can be the selection of an option (e.g., "Balance Due") from a menu of options communicated in the first prompt. As another instance, the output can be a response indicating an intent to acquire targeted account data (e.g., "I would like to know the minimum payment due.") or an instruction to be taken to a certain position in a tree structure associated with the IVR system (e.g., "Take me to Payment History.") on which prompts and navigation of the IVR system are based.

Through the call provider, the authentication platform 102 can convey data responsive to the first prompt as a first response constituting DTMF tones or voice data. Upon receipt of the first response, the IVR system can provide a second prompt for additional information. In a manner similar to handling of the first prompt, the navigation module 214 can convert the voice data of the second prompt to text data based on a suitable speech-to-text technique. The text data can be provided to the machine learning model 402 and an output can be generated by the machine learning model 402. Based on the output, data responsive to the second prompt can be conveyed, through the call provider, to the IVR system as a second response constituting DTMF tones or voice data. The machine learning model 402 can repeatedly generate outputs to provide as responses to successive prompts of the IVR system in this manner until all desired targeted account data are obtained by the navigation module 214 in a single call. Unlike conventional techniques that permit only unidirectional traversal of an IVR system and thus require multiple, separate sessions to acquire multiple items of information, the present technology can acquire multiple items of information from an IVR system in a single call through multi-directional traversal of the IVR system. The navigation module 214 can maintain a running record or log of each item of information acquired through the IVR system in a call. The running log can be compared to a listing of all desired targeted account data to be collected in the call and used to determine whether all desired targeted account data have been acquired. After all desired targeted account data have been obtained, the navigation module 214 can automatically terminate the call with the IVR system (e.g., hang up).

The machine learning model 402 can be trained to generate outputs that support provision of responses for prompts from different IVR systems of various institutions to obtain access to targeted account data. In some embodiments, the machine learning model 402 can be trained by the entity in control of the authentication platform 102. In some embodiments, the machine learning model 402 can be a generative machine learning model, such as a large language model (LLM). In some embodiments, the machine learning model (LLM) 402 can be a generalized or pretrained (or base) LLM that is made available (e.g., open sourced) by a third party entity and further fine tuned (e.g., supervised learning, reinforcement learning) by the entity in control of the authentication platform 102.

Like the machine learning model (LLM) 302, various techniques can be utilized to generate datasets as training data to fine tune the machine learning model (LLM) 402. For example, a dataset can be generated through another machine learning model, such as another pretrained LLM. The LLM can be proprietary or open sourced. In some instances, prompt engineering can be applied to the LLM so that the LLM can achieve higher quality results and more effective outputs to successfully traverse or navigate IVR systems to access various types of targeted account data. The LLM can be provided with various prompts of IVR systems and can output responses to the prompts. The sequence of prompts and responses can constitute a dataset. As another example, a dataset can be generated by providing to another pretrained LLM in an unsupervised manner various series of prompts to cause the LLM to output a corresponding series of responses based on selected temperature values. Each series of prompts and corresponding responses can constitute a dataset. As yet another example, a dataset can be generated manually by deterministically specifying responses to various prompts of IVR systems in a manner that traverses IVR systems to access targeted account data. As yet a further example, a dataset can be generated by hardcoding responses to prompts of IVR systems based on string or text matching. The generated datasets can be appropriately labeled or annotated (e.g., positive examples, negative examples, continuous grading, categorical labels) based on their effectiveness in progressing through IVR systems to successfully acquired targeted account data maintained by the related institutions. The datasets can be utilized for fine tuning so that parameters of the machine learning model (LLM) 402 are adjusted to allow the machine learning model (LLM) 402 to excel in the specific task of seamless navigation through IVR systems to access targeted account data.

In addition, and similar to the machine learning model (LLM) 302, datasets can be generated as training data so that the machine learning model (LLM) 402 can be fine tuned to effectively interact with different IVR systems of various institutions. For example, a dataset can be generated in a manner that is tailored to the unique design and implementation of a particular IVR system of a given institution or a related class of IVR systems with common or similar design and implementation. As a result, the machine learning model (LLM) 402 can effectively maneuver through the particular IVR system or related class of IVR systems in accordance with their unique designs and implementations to obtain targeted account data. In this manner, the machine learning model (LLM) 402 can be further fine tuned based on datasets dedicated to different IVR systems to increase the robustness of the machine learning model (LLM) 402 to handle disparities among the different types of IVR systems. Through such fine tuning, the machine learning model (LLM) 402 can be capable of effectively providing responses to prompts even from IVR systems for which it has not been specifically fine tuned or otherwise trained or customized. In some embodiments, instead of a single machine learning model (LLM) 402 to support navigation for targeted account data, the navigation module 214 can utilize an array of machine learning models (LLMs) to optimally navigate through different IVR systems of various institutions to acquire various types of targeted account data. For example, a unique machine learning model (LLM) can be dedicated to the IVR system of a particular institution. In this example, each machine learning model (LLM) can be separately trained or fine tuned with datasets that are tailored to the particular design and operation of the corresponding IVR system.

In some embodiments, training data (e.g., input-output pairs) to fine tune the machine learning model (LLM) 402 can include sequences of prompts and corresponding responses as datasets that result in access to targeted account data. In some instances, the targeted account data can be a single item of information, such as an account balance, payment due date, minimum payment due date, loan payoff amount, past due amount, interest rate, or the like. To support acquisition of a single item of information maintained by an institution, the training data can include, for example, various prompts and corresponding responses that traverse an IVR system in a manner that leads to acquisition of the single item of information. In some instances, the targeted account data can be multiple items of information maintained by an institution. To support acquisition of a plurality of items of information in a single call through multi-directional navigation through an IVR system, the training data can include, for example, appropriate prompts and corresponding responses that traverse an IVR system in a manner that leads to acquisition of a first item of information (e.g., "Your account balance is $321.45") in a call; then, appropriate prompts and corresponding responses that traverse the IVR system in a manner that leads to acquisition of a second item of information (e.g., "The due date for your next payment is Jul. 4, 2026") in the call; and so on, leading to acquisition of all of the plurality of items of information in the call. For instance, the training data can specify return to a main menu of an IVR system after each item of information is acquired. In this regard, an LLM fine tuned with such training data to enable the acquisition of multiple instances of targeted account data in a single call can avoid increased charges and network usage costs associated with conducting, through a call provider, a dedicated, separate call for each instance of targeted account data to be acquired. In some instances, targeted account data can be found through navigation of an IVR system in an unexpected manner. For example, targeted account data (e.g., last payment) can be accessed through an IVR system by selecting a first option (e.g., "Recent Transactions") from a menu provided in a prompt. In this example, the first option does not necessarily indicate that the targeted account data will be available from selection of the first option, and the menu does not include a dedicated option that specifies the targeted account data (e.g., "Last Payment"). To enable navigation in this example, the training data can include, for example, a prompt providing a menu i) including an option that does not expressly specify targeted account data but that when selected results in access to the targeted account data and ii) not including an option specifying the targeted account data, and a corresponding response selecting the included option. To conclude a call after all targeted account data has been acquired, the training data can include, for example, a prompt including the last targeted account data and a response of silence along with an instruction for the IVR interaction module 210 to end the session. Many variations are possible.

Various types of training data including datasets have been described in relation to the machine learning model (LLM) 302 and the machine learning model (LLM) 402. The descriptions of the referenced training data are examples. Training data described in relation to the machine learning model (LLM) 302 also can be utilized for the machine learning model (LLM) 402, as applicable. Likewise, training data described in relation to the machine learning model (LLM) 402 also can be utilized for the machine learning model (LLM) 302, as applicable. Further, in accordance with the present technology, other training data can be generated to train or fine tune the machine learning model (LLM) 302 and the machine learning model (LLM) 402 to operate in the manners described or manners similar or analogous thereto.

Figure 5:
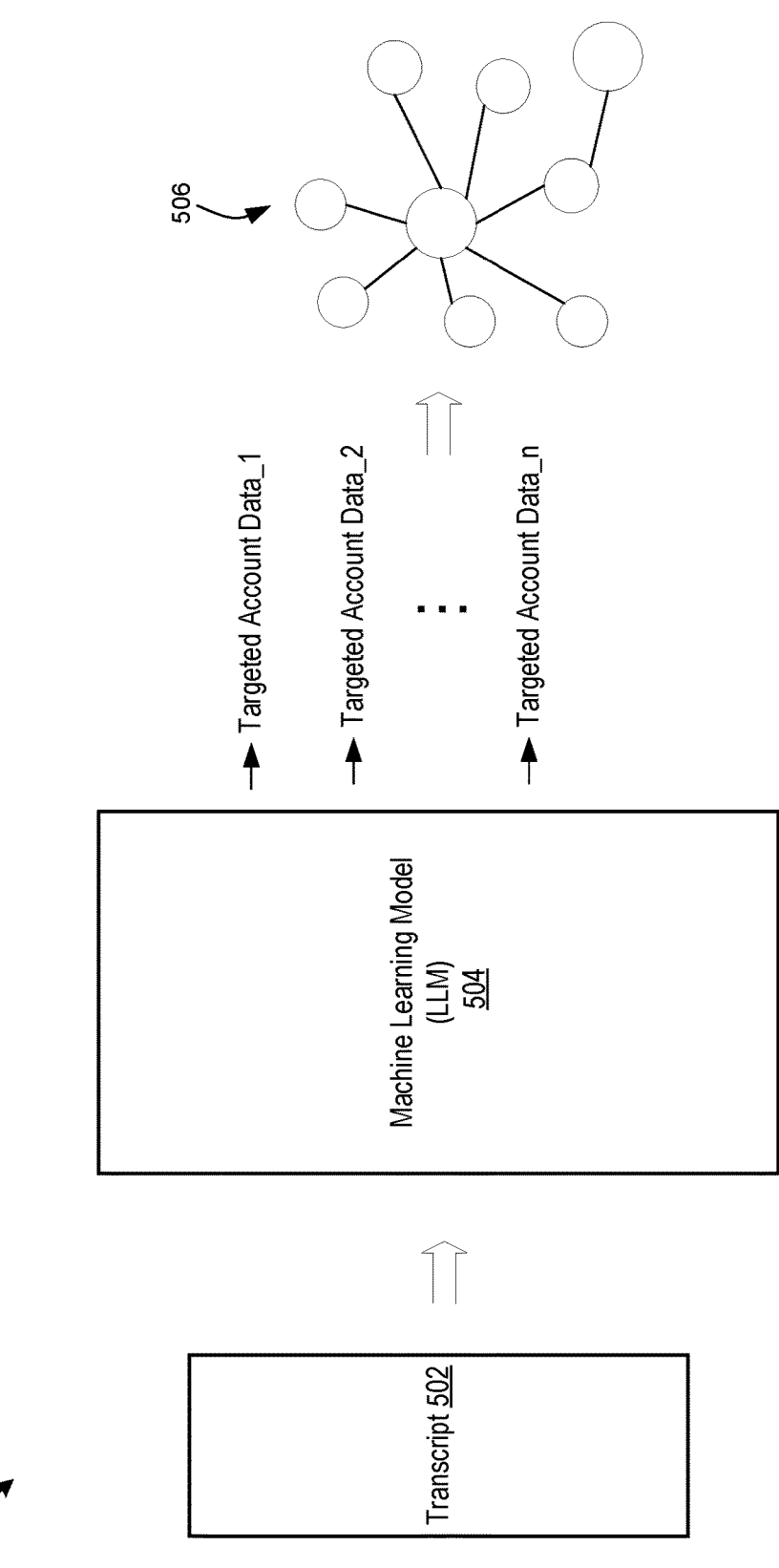
FIG. 5 illustrates an example functional block diagram associated with data extraction, according to an embodiment of the present technology.

The data extraction module 216 of the IVR interaction module 210 can generate a transcript of the session. The transcript can include text data representing voice data provided by the IVR system through various prompts. In some instances, the transcript also can include responses to the prompts provided by the IVR interaction module 210. The data extraction module 216 can extract targeted account data from the transcript and provide it for an entity (e.g., a user, the authentication platform 102, a service provider) who desires the targeted account data, as described. In addition, the data extraction module 216 can cause the extracted account data to be maintained by the authentication platform 102 in the data store 250. FIG. 5 illustrates an example, simplified functional block diagram 500 relating to extraction of targeted account data from a transcript 502 based on a machine learning model 504 that can be utilized by the data extraction module 216. The transcript 502 can be generated by a suitable voice-to-text conversion technique that transforms voice data associated with prompts to text data. For example, the voice-to-text conversion technique can be based on a machine learning model or other mechanism. In some embodiments, the voice-to-text conversion technique utilized by the data extraction module 216 can be more accurate and reliable than the voice-to-text conversion technique utilized by the authentication module 212 and the navigation module 214. In this regard, the conversion technique utilized by the authentication module 212 and the navigation module 214 can be selected based on prioritizing speed of conversion to avoid latencies during real time engagement of the IVR interaction module 210 with an IVR system. In contrast, the voice-to-text conversion technique utilized by the data extraction module 216 can be selected by prioritizing accuracy in conversion over speed of conversion because operation of the data extraction module 216 need not be (or is not) in real time. Upon creation of the transcript, the transcript can be provided to the machine learning model 504 to parse the text data of the transcript and to extract one or more targeted account data from the transcript. For example, the machine learning model 504 can be a large language model (LLM) trained (e.g., fine tuned) to extract targeted account data from a transcript. The data extraction module 216 can perform a verification process on the account data that has been extracted. The verification process can include evaluation of the data (e.g., value of account data) to assess its reasonableness and to determine when the data is not reliable. For example, for a particular type of extracted data in relation to a particular type of account or a particular context, the data extraction module 216 can perform a check to confirm that the extracted data is consistent with or falls within an appropriate value or range of values or satisfies an appropriate threshold value for the data. For instance, based on account information maintained by the authentication platform 102, the data extraction module 216 can determine that the value specified in extracted account data (e.g., next payment due of $25,483 for loan account) falls outside an appropriate value or range of values (e.g., remaining balance of $15,453 for the loan account). When the verification process indicates that extracted account data may be incorrect, the IVR interaction module 210 can engage with the IVR system in another attempt to obtain accurate targeted account data. When the verification process indicates that the extracted targeted account data is reasonable or not incorrect, the targeted account data can be expressed as, for example, attribute-value pairs according to a standard format (e.g., JSON). The targeted account data can be provided for its intended use as desired by, for example, a user, the authentication platform 102, or a service provider. The targeted account data also can be maintained in the data store 250 as represented by a graph 506.

The machine learning model 504 can be trained to extract targeted account data. In some embodiments, the machine learning model 504 can be provided or trained by the entity in control of the authentication platform 102. In some embodiments, the machine learning model 504 can be a generative machine learning model, such as a large language model (LLM). In some embodiments, the machine learning model (LLM) 504 can be a generalized or pretrained (or base) LLM that is made available (e.g., open sourced) by a third party entity and further fine tuned (e.g., supervised learning, reinforcement learning) by the entity in control of the authentication platform 102.

Various techniques can be utilized to generate datasets as training data to fine tune the machine learning model (LLM) 504. For example, a dataset can be generated through another machine learning model, such as another pretrained LLM. The LLM can be proprietary or open sourced. In some instances, prompt engineering can be applied to the LLM so that the LLM can achieve higher quality results and more effective outputs reflecting accurate extraction of different types of targeted account data from text data. The LLM can be provided with various text data and can output extracted targeted account data from the text data. The text data and extracted targeted account data can constitute a dataset. As another example, a dataset can be generated manually by identifying targeted account data from text data as extracted targeted account data. The text data and the manually identified targeted account data can constitute a dataset.

The generated datasets can be appropriately labeled or annotated (e.g., positive examples, negative examples, continuous grading, categorical labels) based on their effectiveness in extracting targeted account data sought by the IVR interaction module 210. The datasets can be utilized for fine tuning so that parameters of the machine learning model (LLM) 504 are adjusted to allow the machine learning model (LLM) 504 to excel in the specific task of extracting targeted account data from transcripts of text data.

Datasets can be generated as training data so that the machine learning model (LLM) 504 can be fine tuned to accurately extract targeted account data from transcripts. For example, a dataset can be generated in a manner that is tailored to the unique design and implementation of a particular IVR system of a given institution or a related class of IVR systems with common or similar design and implementation. As a result, the machine learning model (LLM) 504 can effectively extract targeted account data reflected in text data reflecting the unique verbal expressions and specific language usage of the particular IVR system or related class of IVR systems. In this manner, the machine learning model (LLM) 504 can be further fine tuned based on datasets dedicated to different IVR systems to increase the robustness of the machine learning model (LLM) 504 to handle disparities among the different types of IVR systems. Through such fine tuning, the machine learning model (LLM) 504 can be capable of effectively extracting targeted account data even from transcripts of text data for which it has not been specifically fine tuned or otherwise trained or customized. In some embodiments, instead of a single machine learning model (LLM) 504 to extract targeted account data, the data extraction module 216 can utilize an array of machine learning models (LLMs) to extract targeted account data from transcripts associated with different IVR systems of associated institutions. For example, a unique machine learning model (LLM) can be dedicated to the IVR system of a particular institution. In this example, each machine learning model (LLM) can be separately trained or fine tuned with datasets that are tailored to the particular design and operation of the corresponding IVR system.

In some embodiments, training data (e.g., input-output pairs) to fine tune the machine learning model (LLM) 504 can include text data and extracted targeted account data from the text data. In some instances, the text data associated with different IVR systems can contain varying expressions of the same targeted account data. To support uniform recognition and extraction, the training data can include, for example, various expressions of targeted account data (e.g., "You're able to charge up to $XXX."; "Your available credit is $XXX.") in text data of a transcript and an expression of the targeted account data according to a standardized format of the authentication platform 102 (e.g., "available_credit": ="$XXX"). In some instances, account data in text data of a transcript can be erroneous. To support accurate recognition and extraction of targeted account data, the training data can include, for example, an erroneous expression of targeted account data (or value thereof) in text data (e.g., "$59.333333") and a correct expression of the targeted account data (e.g., "59.33"). In some instances, text data can include information that is irrelevant to targeted account data. For example, the irrelevant information can include lengthy marketing content, legal disclaimers, and the like that precede or follow targeted account data. To dispense with such irrelevant information, the training data can include, for example, text data containing irrelevant information with targeted account data and the targeted account data without the irrelevant information. Many variations are possible.

From the receipt of prompts by an IVR system or an associated transcript reflecting information conveyed in the prompts, the IVR interaction module 210 can determine information about an account in addition to targeted account data. The content of prompts from the IVR system can allow the IVR interaction module 210 to discover new implicit information or explicit information relating to the account. For example, if the IVR system accepts only a particular response of a certain type relating to a user (e.g., a certain previous zip code) out of a multitude of responses of the same type (e.g., multiple previous zip codes), the IVR interaction module 210 can determine that the associated institution maintains a record of only the particular response. Accordingly, IVR interaction module 210 can utilize, as needed, the particular response in future engagement with the IVR system in relation to the user. Further, one or more machine learning models (LLMs) utilized by the IVR interaction module 210 for the IVR system can be retrained or further fine tuned with training data based on the particular response. In addition, the IVR interaction module 210 can inform the user or the authentication platform 102 to update the records of the institution with account data associated with a desired response instead of the particular response. As another example, the IVR interaction module 210 can identify a key term (or key word) in a transcript (e.g., "reward balance") that is associated with a standardized format for account data recognized by the authentication platform 102 (e.g., "reward balance"). In this example, the key term is not targeted account data. Nonetheless, because the key term has been recognized, the key term and its associated value can be extracted and maintained by the authentication platform 102, increasing the knowledge of the authentication platform 102 in relation to the account. As yet another example, engagement by the IVR interaction module 210 with an IVR system in relation to an account can indicate a status of the account. The IVR interaction module 210 can generate responses to prompts to authenticate with and navigate through an IVR system to access targeted account data. However, if the IVR system provides a prompt that the account is closed, the IVR interaction module 210 can determine that the status of the account is closed and accordingly update the account information maintained by the authentication platform 102. The foregoing are only examples, and the present technology encompasses other techniques to discover new information about an account.

FIG. 6 illustrates an example method 600, according to an embodiment of the present technology. It should be understood that there can be additional, fewer, or alternative steps performed in similar or alternative orders, or in parallel, based on the various features and embodiments discussed herein unless otherwise stated. At block 602, the method 600 can receive a set of prompts from an interactive voice response (IVR) system of an institution during a session. At block 604, the method 600 can provide data associated with the set of prompts to one or more machine learning models trained based on training data. At block 606, the method 600 can, based on the one or more machine learning models, generate during the session a set of responses to the set of prompts for the IVR system to at least one of a) authenticate a user and b) access targeted account data maintained by the institution through the IVR system.

Figure 7:
FIG. 7 illustrates an example computer system or computing device, according to an embodiment of the present technology.

FIG. 7 illustrates an example of a computer system 700 that may be used to implement one or more of the embodiments of the present technology. For example, the computer system 700 can be implemented as a server or server system of the authentication platform 102, the call provider 120, the institution 130, an entity associated with the third party application 104, a mobile network operator, a data source, or an agency. The computer system 700 can be included in a wide variety of local and remote machine and computer system architectures and in a wide variety of network and computing environments that can implement the functionalities of the present technology. The computer system 700 includes sets of instructions 724 for causing the computer system 700 to perform the functionality, features, and operations discussed herein. The computer system 700 may be connected (e.g., networked) to other machines and/or computer systems. In a networked deployment, the computer system 700 may operate in the capacity of a server or a client machine in a client-server network environment, or as a peer machine in a peer-to-peer (or distributed) network environment.

The computer system 700 includes a processor 702 (e.g., a central processing unit (CPU), a graphics processing unit (GPU), or both), a main memory 704, and a nonvolatile memory 706 (e.g., volatile RAM and non-volatile RAM, respectively), which communicate with each other via a bus 708. In some embodiments, the computer system 700 can be a desktop computer, a laptop computer, personal digital assistant (PDA), or mobile phone, for example. In one embodiment, the computer system 700 also includes a video display 710, an alphanumeric input device 712 (e.g., a keyboard), a cursor control device 714 (e.g., a mouse), a signal generation device 718 (e.g., a speaker) and a network interface device 720.

In one embodiment, the video display 710 includes a touch sensitive screen for user input. In one embodiment, the touch sensitive screen is used instead of a keyboard and mouse. A machine-readable medium 722 can store one or more sets of instructions 724 (e.g., software) embodying any one or more of the methodologies, functions, or operations described herein. The instructions 724 can also reside, completely or at least partially, within the main memory 704 and/or within the processor 702 during execution thereof by the computer system 700. The instructions 724 can further be transmitted or received over a network 740 via the network interface device 720. In some embodiments, the machine-readable medium 722 also includes a database 730.

The processor 702 can be, for example, a hardware based integrated circuit (IC) or any other suitable processing device configured to run or execute a set of instructions or a set of codes. For example, the processor 702 can include a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like.

The network 740, which can represent the network 118, can be, for example, a digital telecommunication network of servers and/or computing devices. The servers and/or computing device on the network can be connected via one or more wired or wireless communication networks (not shown) to share resources such as, for example, data storage and/or computing power. The wired or wireless communication networks between servers and/or computing devices of the network can include one or more communication channels, for example, a radio frequency (RF) communication channel(s), an extremely low frequency (ELF) communication channel(s), an ultra-low frequency (ULF) communication channel(s), a low frequency (LF) communication channel(s), a medium frequency (MF) communication channel(s), an ultra-high frequency (UHF) communication channel(s), an extremely high frequency (EHF) communication channel(s), a fiber optic communication channel(s), an electronic communication channel(s), a satellite communication channel(s), and/or the like. The network can be, for example, the Internet, an intranet, a local area network (LAN), a wide area network (WAN), a metropolitan area network (MAN), a worldwide interoperability for microwave access network (WiMAX®), any other suitable communication system, and/or a combination of such networks.

The network 740 can use standard communications technologies and protocols. Thus, the network can include links using technologies such as Ethernet, 702.11, worldwide interoperability for microwave access (WiMAX®), 3G, 4G, 5G, CDMA, GSM, LTE, digital subscriber line (DSL), etc. Similarly, the networking protocols used on the network can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 706 may also be a random access memory. The non-volatile memory 706 can be a local device coupled directly to the rest of the components in the computer system 700. A non-volatile memory that is remote from the system, such as a network storage device coupled to any of the computer systems described herein through a network interface such as a modem or Ethernet interface, can also be used.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 700 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in the same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine or computer-readable media used to actually affect the distribution.

Some embodiments described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java™, JavaScript, C++, and/or other programming languages and software development tools. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java™, C++, etc.) or other suitable programming languages and/or development tools. Additional examples of computer code include, but are not limited to, control signals, encrypted code, and compressed code.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in some embodiments," "in various embodiments," "in an example," "in one implementation," "in one instance," or the like means that a particular feature, design, structure, or characteristic described in connection with the embodiment is included in at least one embodiment of the technology. The appearances of, for example, the phrases "according to an embodiment," "in one embodiment," "in an embodiment," "in some embodiments," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
    receiving, by a computing system, a set of prompts from an interactive voice response (IVR) system of an institution during a session;
    providing, by the computing system, data associated with the set of prompts to one or more machine learning models trained based on training data; and
    based on the one or more machine learning models, generating, by the computing system, during the session a set of responses to the set of prompts for the IVR system to at least one of a) authenticate a user and b) access targeted account data maintained by the institution through the IVR system, wherein the one or more machine learning models are configured to generate responses that enable multi-directional navigation of the IVR system for acquisition of multiple types of the targeted account data in the session.

2. The computer-implemented method of claim 1, wherein the operations further comprise:

generating a transcript associated with the session; and
    based on the one or more machine learning models, extracting targeted account data from the transcript.

3. The computer-implemented method of claim 1, wherein the one or more machine learning models include large language models (LLMs) fine tuned based on the training data, the training data generated by another LLM to which prompt engineering associated with authentication with and navigation of an IVR system to acquire targeted account data is applied.

4. The computer-implemented method of claim 1, wherein the training data comprises training examples including sequences having different numbers of prompt/response pairs.

5. The computer-implemented method of claim 1, wherein the training data comprises a training example including a first prompt equivalent to a second prompt, each of the first prompt and the second prompt associated with a corresponding common response.

6. The computer-implemented method of claim 1, wherein the training data comprises a training example including a first prompt for information and a corresponding first response including data, and a second prompt for the information and a corresponding second response of silence.

7. The computer-implemented method of claim 1, wherein the training data comprises a training example including a prompt for information that is not available and a response of silence.

8. The computer-implemented method of claim 1, wherein the training data comprises a training example including a first prompt for a type of information and a corresponding first response including a first instance of the type of information associated with a first time, and a second prompt for the type of information and a corresponding second response including a second instance of the type of information associated with a second time.

9. The computer-implemented method of claim 1, wherein the training data comprises a first sequence of prompt/response pairs to acquire a first type of targeted account data and a second sequence of prompt/response pairs to acquire a second type of targeted account data in a session.

10. The computer-implemented method of claim 1, wherein the one or more machine learning models include a first LLM associated with authentication with the IVR system, a second LLM associated with navigation of the IVR system to acquire targeted account data, and a third LLM associated with extraction of data from a transcript of the session.

11. A system comprising:
    at least one processor; and
    a memory storing instructions that, when executed by the at least one processor, cause the system to perform operations comprising:
    receiving a set of prompts from an interactive voice response (IVR) system of an institution during a session;
    providing data associated with the set of prompts to one or more machine learning models trained based on training data; and
    based on the one or more machine learning models, generating during the session a set of responses to the set of prompts for the IVR system to at least one of a) authenticate a user and b) access targeted account data maintained by the institution through the IVR system, wherein the one or more machine learning models are configured to generate responses that enable multi-directional navigation of the IVR system for acquisition of multiple types of the targeted account data in the session.

12. The system of claim 11, wherein the operations further comprise:

generating a transcript associated with the session; and based on the one or more machine learning models, extracting targeted account data from the transcript.

13. The system of claim 11, wherein the one or more machine learning models include large language models (LLMs) fine tuned based on the training data, the training data generated by another LLM to which prompt engineering associated with authentication with and navigation of an IVR system to acquire targeted account data is applied.

14. The system of claim 11, the training data comprises a training example including a prompt for information that is not available and a response of silence.

15. The system of claim 11, wherein the one or more machine learning models include a first LLM associated with authentication with the IVR system, a second LLM associated with navigation of the IVR system to acquire targeted account data, and a third LLM associated with extraction of data from a transcript of the session.

16. A non-transitory computer-readable storage medium including instructions that, when executed by at least one processor of a computing system, cause the computing system to perform operations comprising:

receiving a set of prompts from an interactive voice response (IVR) system of an institution during a session;

providing data associated with the set of prompts to one or more machine learning models trained based on training data; and based on the one or more machine learning models, generating during the session a set of responses to the set of prompts for the IVR system to at least one of a) authenticate a user and b) access targeted account data maintained by the institution through the IVR system, wherein the one or more machine learning models are configured to generate responses that enable multi-directional navigation of the IVR system for acquisition of multiple types of the targeted account data in the session.

17. The non-transitory computer-readable storage medium of claim 16, wherein the operations further comprise:

generating a transcript associated with the session; and based on the one or more machine learning models, extracting targeted account data from the transcript.

18. The non-transitory computer-readable storage medium of claim 16, wherein the one or more machine learning models include large language models (LLMs) fine tuned based on the training data, the training data generated by another LLM to which prompt engineering associated with authentication with and navigation of an IVR system to acquire targeted account data is applied.

19. The non-transitory computer-readable storage medium of claim 16, the training data comprises a training example including a prompt for information that is not available and a response of silence.

20. The non-transitory computer-readable storage medium of claim 16, wherein the one or more machine learning models include a first LLM associated with authentication with the IVR system, a second LLM associated with navigation of the IVR system to acquire targeted account data, and a third LLM associated with extraction of data from a transcript of the session.

* * * * *